United States Patent
Dorfman et al.

(10) Patent No.: US 9,476,738 B2
(45) Date of Patent: Oct. 25, 2016

(54) OPTICAL WAVEGUIDE SYSTEM FOR INTERROGATING A PLURALITY OF SENSOR NODES WHEREIN A LOCATION OF THE RECEIVED INPUT SIGNAL IS DETERMINED

(71) Applicant: RAYTHEON BBN TECHNOLOGIES CORP., Cambridge, MA (US)

(72) Inventors: Yevgeniy Yakov Dorfman, Newton, MA (US); Scott Evan Ritter, Sudbury, MA (US); Jonathan L. Habif, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 155 days.

(21) Appl. No.: 14/318,532

(22) Filed: Jun. 27, 2014

(65) Prior Publication Data
US 2015/0377655 A1    Dec. 31, 2015

(51) Int. Cl.
*G01D 5/353* (2006.01)
*G01V 3/12* (2006.01)
*G01V 1/22* (2006.01)

(52) U.S. Cl.
CPC ...... *G01D 5/35383* (2013.01); *G01D 5/35367* (2013.01); *G01V 1/226* (2013.01); *G01V 3/12* (2013.01)

(58) Field of Classification Search
CPC ............ G01D 5/35354; G01D 5/35383; G01N 21/01; H04J 14/0279
USPC ............ 250/227.11, 227.14, 227.16, 227.19, 250/227.21, 238; 385/11–13; 356/73.1; 73/705–708, 720, 800
See application file for complete search history.

(56) References Cited

U.S. PATENT DOCUMENTS

| | | | |
|---|---|---|---|
| 4,652,129 A | 3/1987 | Martinelli | |
| 4,773,758 A | 9/1988 | Shaw | |
| 4,778,248 A * | 10/1988 | Arzur | G02B 26/04 250/227.21 |
| 5,216,240 A * | 6/1993 | Clift | G01D 5/35383 250/227.16 |
| 5,276,322 A | 1/1994 | Carome | |
| 7,245,789 B2 | 7/2007 | Bates et al. | |
| 8,564,786 B2 | 10/2013 | Crickmore et al. | |

(Continued)

FOREIGN PATENT DOCUMENTS

WO    WO 2007/122477 A2    11/2007

OTHER PUBLICATIONS

Andersen, et al., "New fiber optic geophone improves 4D seismic," Offshore, Oct. 1, 2009, http://www.offshore-mag.com/articles/print/volume-69/issue-10/geology-_geophysics/ne . . . , 5 pgs.

(Continued)

*Primary Examiner* — Que T Le
(74) *Attorney, Agent, or Firm* — Lewis Roca Rothgerber Christie LLP

(57) ABSTRACT

A system including an optical waveguide having a length extending from an optical interrogator at a first end, a plurality of light-modulating sensor nodes disposed at predetermined locations along the length of the optical waveguide, each of the plurality of light-modulating sensor nodes having an optical modulator for modulating an optical signal propagating from the optical interrogator in the optical waveguide, and for returning the modulated optical signal to the optical interrogator in an opposite direction along the same optical waveguide path.

20 Claims, 8 Drawing Sheets

(56) References Cited

U.S. PATENT DOCUMENTS 8,661,907 B2 3/2014 Davis et al.
2003/0217886 A1 11/2003 Paulsson

OTHER PUBLICATIONS

Baldwin, et al., "Review of Fiber Optic Accelerometers," Systems Planning & Analysis, Inc. Advanced Engineering Development Program, 7 pgs.

Brown, et al., "An Interferometric Fiber Optic Accelerometer," SPIE vol. 1367 Fiber Optic and Laser Sensors VIII (1990), pp. 282-288.

Deng, Jiangdong, "Development of Novel Optical Fiber Interferometric Sensors with High Sensitivity for Acoustic Emission Detection," Oct. 12, 2004, Copyright 2004, 152 pgs.

Dorleus, PhD., et al., "A Fiber Optic Seismic Sensor for Unattended Ground Sensing Applications," TechNotes ITEA Journal 2009; 30: 455-460, Copyright 2009 by the International Test and Evaluation Association, 30(4) Dec. 2009, pp. 455-460.

Guzman-Sepulveda, et al., "Fiber Optic Vibration Sensor based on Multimode Interference Effects," CLEO Technical Digest Copyright OSA 2012, JW2A.117.pdf, 2 pgs.

Liu, et al., "Distributed optical fiber vibration sensing system based on polarization detection," Optoelectronics Letters, vol. 7 No. 6, Nov. 1, 2011, pp. 0458-0462.

Smith, Jason, "Fiber-Optic Sensors as Accelerometers and Opto-Mechanical Strain Gauges," Mississippi State University, Bagley College of Engineering, ECE Department, 4 pgs.

Zhang, et al., "A novel fiber Bragg grating based seismic geophone for oil/gas prospecting," Smart Structures and Materials 2005: Sensors and Smart Structures Technologies for Civil, Mechanical, and Aerospace Systems, edited by Masayoshi Tomizuka, Proc. of SPIE vol. 5765, pp. 1112-1120.

\* cited by examiner

OPTICAL WAVEGUIDE SYSTEM FOR INTERROGATING A PLURALITY OF SENSOR NODES WHEREIN A LOCATION OF THE RECEIVED INPUT SIGNAL IS DETERMINED

CROSS-REFERENCE TO RELATED APPLICATION

The present application is related to co-pending U.S. patent application Ser. No. 14/318,549, filed on even date herewith, which is incorporated herein by reference in its entirety.

FIELD

The present disclosure relates to sensors arrays. More particularly, it relates to a system and method for optically reading a sensor array.

BACKGROUND

When conducting activities such as underwater acoustic monitoring, large structural monitoring, or geophysical surveys, sensors are typically disposed at locations where such monitoring is desired, while a monitoring station is located remotely at some distance away from the particular area that is being monitored or surveyed by the sensors. For example, many kilometers of lines of vibration sensors (e.g., geophones or accelerometers) are used in geophysical exploration, many kilometers of lines of acoustic sensors are towed by ships and submarines, and other sensor modalities (e.g., chemical) may be envisioned in other applications. Currently, these sensors utilize electrically conductive channels for power and/or data. Complex power hungry electronics may be required at each sensor to synchronize and/or format sensor data for digital data communications. Analog data communications require long multichannel analog cables that are expensive, hard to maintain and repair, and are susceptible to Electro-Magnetic Interference (EMI).

SUMMARY

According to a first aspect, a system is described comprising an optical waveguide having a length extending from an optical interrogator at a first end, and a plurality of light-modulating sensor nodes coupled to the optical waveguide at predetermined locations along the length of the optical waveguide, each of the plurality of light-modulating sensor nodes comprising an optical modulator configured to modulate an optical signal propagating from the optical interrogator in the optical waveguide, and configured to return the modulated optical signal to the optical interrogator in an opposite direction along the same optical waveguide path.

The optical modulator may be externally coupled to the optical waveguide.

The optical modulator may comprise an actuator configured to optically modulate the optical signal by changing physical properties of the optical waveguide from an exterior of the optical waveguide.

The optical interrogator may comprise an optical pulse generator configured to generate the optical signal, wherein the optical signal is an optical pulse.

The plurality of light-modulating sensor nodes further comprises an acoustic, vibration, magnetic, or chemical transducer.

The optical modulator may be configured to modulate the optical pulse in response to the signal detected by the transducer.

The optical interrogator may further comprise an optical receiver configured to receive the returned modulated optical signal from each of the plurality of light-modulating sensor nodes.

The receiver may be configured to identify the light-modulating sensor node from the plurality of light-modulating sensor nodes from which the received optical signal is reflected.

The optical modulator may be in-line with the optical waveguide.

The optical modulator may comprise a phase modulator configured to change a phase of the optical signal in the optical waveguide.

The optical modulator may comprise an amplitude modulator configured to change an amplitude of the optical signal in the optical waveguide.

The optical modulator may comprise a polarity controller configured to change a polarization of the optical signal in the optical waveguide.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components.

DETAILED DESCRIPTION

The present invention will now be described more fully with reference to the accompanying drawings, in which example embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

As used herein, two components are said to be "coupled" or "optically coupled" respectively, if, electrical or optical signals may propagate from one component to the other, either directly through an electrically conductive cable or optical waveguide, or indirectly through other components such as connectors, lenses, etc. The terms "direct" or "directing" of an optical signal or pulse refers to an act of redirection or transmission of light.

Figure 1:
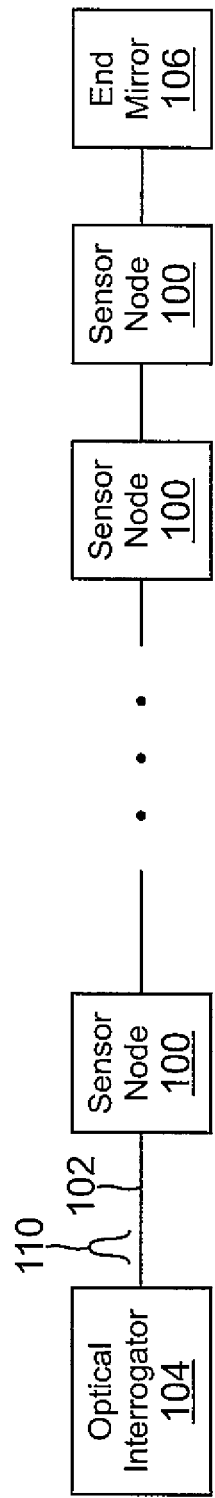
FIG. 1 shows a block diagram of a plurality of sensor nodes directly coupled to an optical waveguide according to an embodiment of the present invention.
Figure 4:
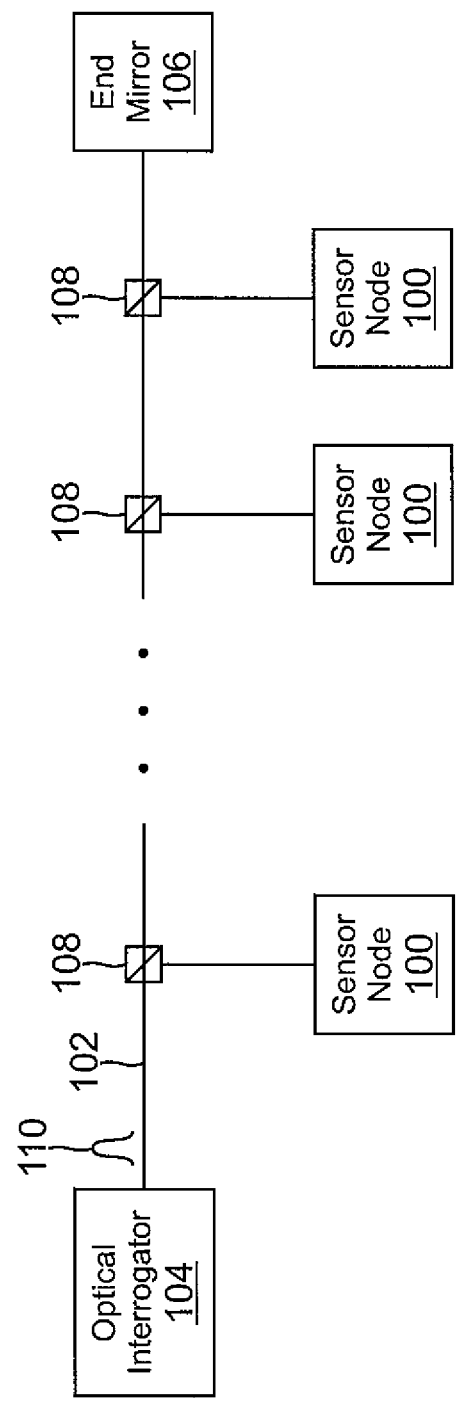
FIG. 4 shows a block diagram of a plurality of sensor nodes coupled to the optical waveguide by using beam splitters according to another embodiment of the present invention.

The embodiments of the present invention are directed to a sensor node concept and a physical communications system that allows for a plurality of sensor nodes to be coupled, directly or indirectly, to a long (e.g., up to several kilometers), distributed, deterministically-sampled sensing array using optical components and optical waveguides (e.g., optical fiber) as shown with block diagrams in FIGS. 1 and 4. In some embodiments, the sensor node is a device that is interrogated by an optical pulse.

In some embodiments, sensor systems and methods that include large numbers of sensors (e.g., hundreds of sensors) spaced apart at arbitrary and random distances (i.e., not necessarily equal distances) are disclosed. In some embodiments, the system may use low loss optical fibers to couple the sensors in a long linear array (e.g., many kilometers in length). The amount of power consumed by the system according to the various embodiments of the present invention can be substantially reduced because the amount of electrical circuitry in each of the sensor nodes is reduced.

FIG. 1 shows an array of sensor nodes 100 coupled to an optical waveguide 102 that extends from an optical interrogator 104 ("interrogator") located at a first end (e.g., proximate end) of the optical waveguide 102 to an end of the optical waveguide (e.g., distal end). In some embodiments, an end mirror 106 is connected to the end of the optical waveguide 102. Yet, in other embodiments, the end of the optical waveguide 102 can be left open, or connected to other devices, such as, for example, an end cap.

In some embodiments, the interrogator 104 includes an optical pulse generator to produce one or more optical pulses 110 that propagate along the optical waveguide 102 in the direction of the array of sensor nodes 100. The optical pulse generator can be any suitable optical pulse generator, such as, for example, a laser generator. The interrogator 104 may also include an optical receiver to collect and process information contained in the optical pulses returning from the array of sensor nodes 100 in an opposite direction along the same optical waveguide 102, which will be described in more detail later.

The returning optical pulses are inherently time division multiplexed based on the distance of each of the sensor nodes 100 from the interrogator 104. For example, the amount of time it takes for the optical pulse 110 to propagate to, and return from a sensor node 100 that is located closer to the interrogator 104 is less compared to the amount of time it takes for the optical pulse 110 to propagate to, and return from a sensor node 100 that is located farther from the interrogator 104. Thus, the optical receiver of the interrogator 104 is able to distinguish which sensor node 100 returned the optical pulses 110 based on time division multiplexing.

According to some embodiments, the array of sensor nodes 100 is arranged in a linear array such that each of the sensor nodes 100 is coupled to different points along the length of the optical waveguide 102. That is, each sensor node 100 is coupled to the optical waveguide 102 at some distance away from the interrogator 104. In some embodiments, the sensor nodes 100 include a transducer (to detect e.g., acoustic or vibration signals) and a modulator to modulate the optical pulse 110 according to the detected signals.

Figure 2:
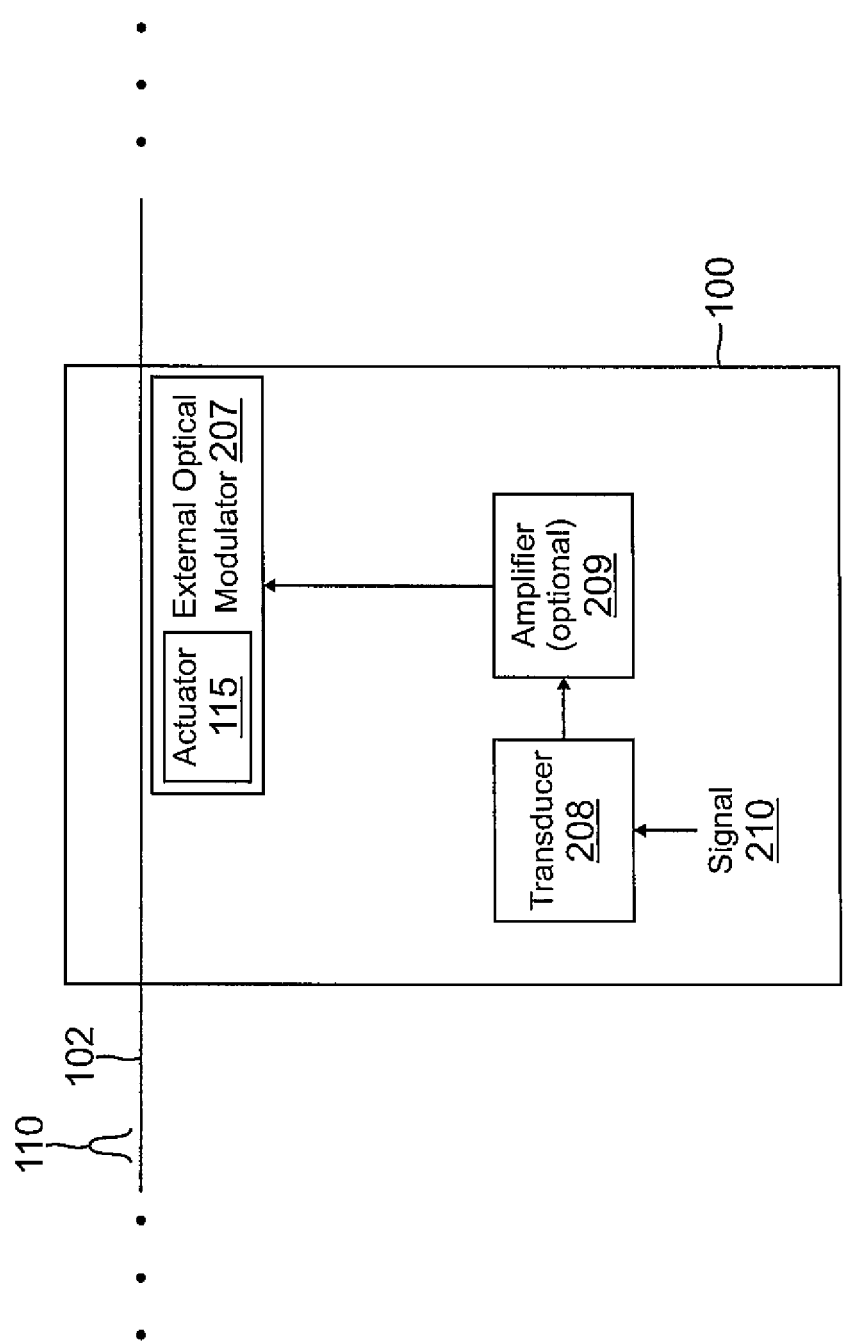
FIG. 2 shows a block diagram of a sensor node coupled externally with an optical waveguide according to an embodiment of the present invention.
Figure 3:
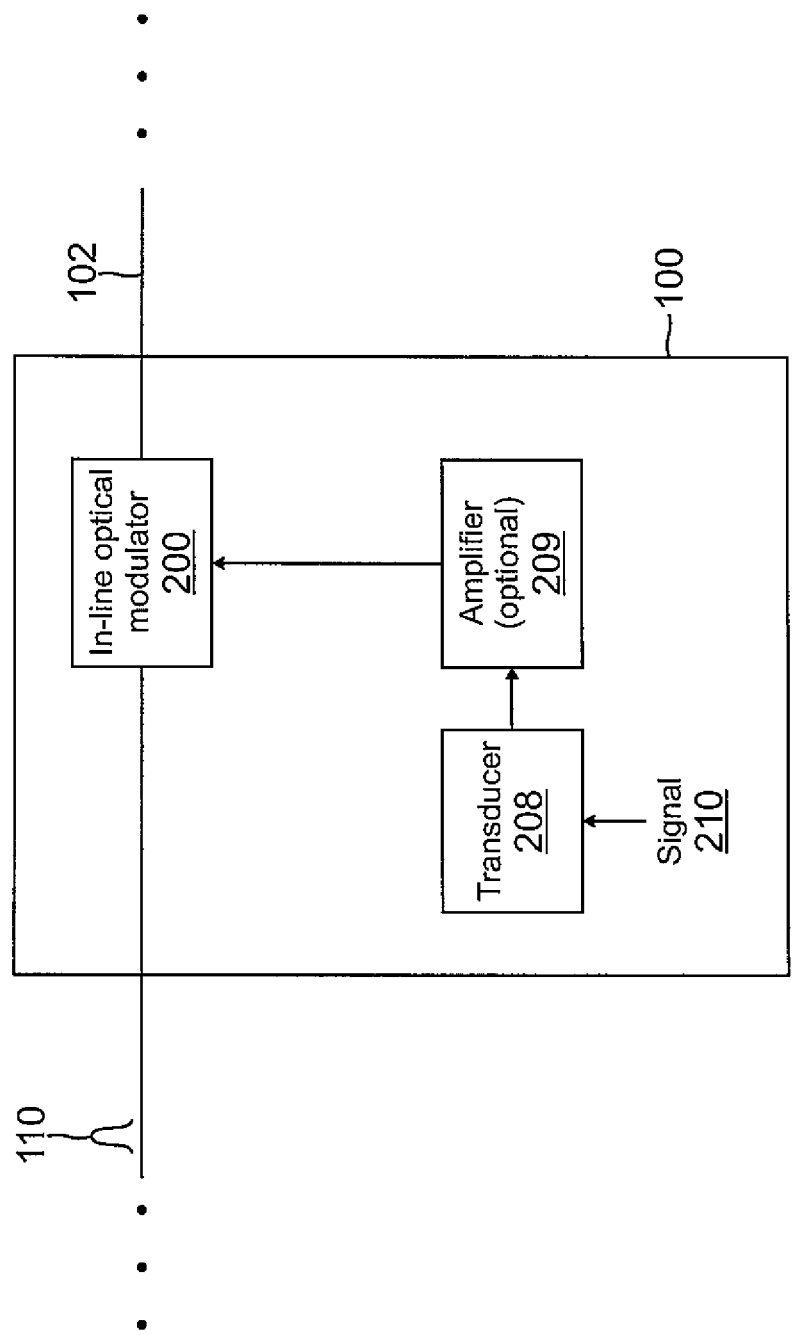
FIG. 3 shows a block diagram of a sensor node coupled internally with an optical waveguide according to another embodiment of the present invention.

FIGS. 2 and 3 each show a sensor node 100 that includes a suitable transducer 208 for sensing an incoming signal 210, and providing an output signal from the transducer 208 to an external optical modulator 207 or an in-line optical modulator 200. The transducer 208 may be, for example, an acoustic or vibration sensor that outputs an electric signal in response to sensing an acoustic or a vibration signal. Optionally, an amplifier 209 can be included in the sensor node 100 to increase the output power from the transducer 208 prior to providing the electric signal to the optical modulator 200, 207. Thus, the optical modulator 200, 207 is controlled by the electrical output signal from the transducer 208 (or an amplified output signal) to change (e.g., modulate) the properties of the waveguide 102 from the outside of the waveguide 102, as shown in FIG. 2 based on the detected signal 210. While an amplifier 209 is shown in FIGS. 2 and 3, by way of example, the amplifier 209 may or may not be necessary depending on the application of the sensor nodes. For example, in some applications, the sensor node 100 may be used to detect larger signals which may not require the transducer 208 output signal to be amplified, while in some applications the sensor node 100 may be used to detect smaller signals which may require the transducer 208 output signal to be amplified before being provided to an optical modulator 200, 207.

According to an embodiment, FIG. 2 shows the external optical modulator 207 that comprises an actuator 115 to mechanically affect the optical pulse 110 in the optical waveguide 102 from the exterior of the optical waveguide 102. In some embodiments, the actuator 115 may apply a local force (e.g., squeezing) to the optical waveguide 102, cause a local temperature change of the optical waveguide 102, or apply an electric or magnetic field directly to the exterior of the optical waveguide 102, all of which affects local optical properties of the optical waveguide 102 (e.g., optical fiber properties), which in turn, causes a local change in the optical reflection and/or transmission coefficients of the optical pulse 110 that manifests, for example, a changed reflected pulse magnitude and/or phase detected by the receiver at the interrogator 104. Accordingly, the sensor system can determine which sensor node 100 detected the input signal (e.g., acoustic or vibration signal) without splicing the waveguide 102.

In some embodiments, these changes to the optical properties of the optical pulse 110 may be performed internally to the waveguide as shown in FIG. 3, for example, by splicing a phase modulator or polarization controller in-line (internally) with the optical waveguide 102 as shown in FIG. 3. Similar to the embodiment described with reference to FIG. 2, the transducer 208 detects an input signal 210 (e.g., acoustic or vibration signals) and outputs an electric signal to the optical modulator 200. In some embodiments, the output signal from the transducer may be amplified by an optional amplifier 209 to increase the electric signal that is provided to the optical modulator 200. The modulation is controlled by the electric output signal of the transducer 208, in response to the detected input signal 210. In some embodiments, the in-line optical modulator 200 comprises, for example, a phase modulator to change the phase of the optical pulse 110, or a polarization controller to change the polarity of the optical pulse 110 from the interrogator 104. According to an embodiment, the optical pulse from the interrogator 104 is modulated by the optical modulator 200, thus changing the optical properties of the optical pulse 110 that is reflected back to the interrogator 104. The receiver detects the phase change or the polarity change of the reflected signal with respect to the original unmodulated optical signal 110 provided by the interrogator 104, and through time division multiplexing, it determines which sensor node 100 detected the input signal 210. Accordingly, the sensor system can determine the location of the acoustic or vibration signal by directly splicing an in-line optical modulator 200 in the optical waveguide 102. While the phase modulator and the polarization controller are described as examples herein, the optical modulators 200 are not limited to a phase modulator or a polarization controller. Instead, the optical modulator 200 may comprise other types of optical modulators known by persons skilled in the art.

According to another embodiment, FIGS. 5-8 show a system for sensing signals (e.g., acoustics or vibrations) and compensating for distortions in the optical pulse 110 that propagates to/from the interrogator 104 from/to the sensor node 100. Furthermore, the system may incorporate a differential readout to compensate for fiber cable drift.

FIG. 4 shows an array of sensor nodes 100 coupled to the optical waveguide 102 through the use of a beam splitter 108. According to an embodiment, the beam splitter 108 splits a portion of the optical pulse propagating in the waveguide 102 toward each of the sensor nodes 100.

According to some embodiments, a plurality of beam splitters 108 are disposed along the optical waveguide 102 at locations where each of the sensor nodes 100 connects to the optical waveguide 102. Thus, as the optical pulse 110 propagates along the optical waveguide 102, a portion of the optical pulse 110 is split by one of the beam splitters 108 and directed to the sensor node 100. The remaining portion of the optical pulse 110 continues to propagate down the optical waveguide 102 until it reaches another beam splitter 108. When the remaining portion of the optical pulse 110 reaches another beam splitter 108, the optical pulse 110 is further split and a portion thereof is directed to the corresponding sensor node 100. In some embodiments, suitable optical amplifiers can be disposed along the optical waveguide 102 to amplify the optical pulses 110 as they propagate down the optical waveguide 102 to improve the signal to noise ratio, extending the range of the optical pulses 110.

Figure 5:
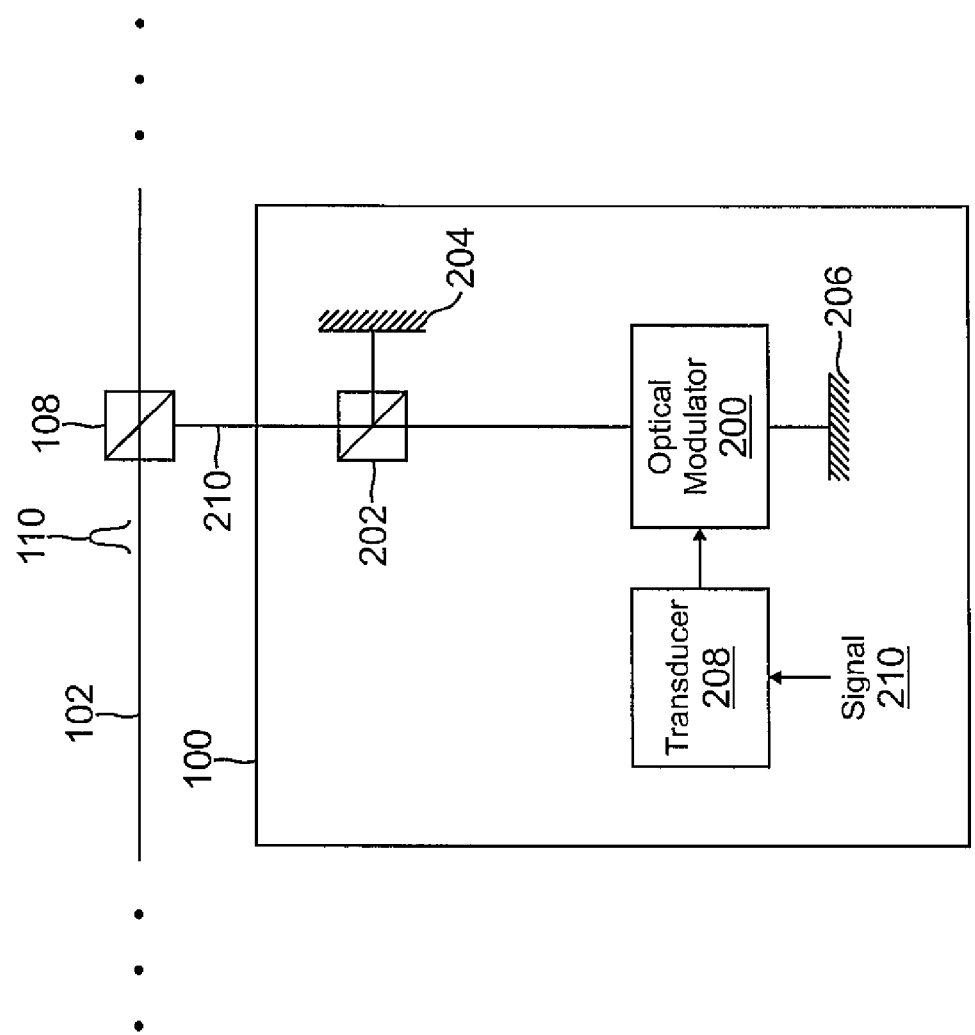
FIG. 5 shows a block diagram of a sensor node coupled to the optical waveguide and a method to compensate for distortions caused by the optical waveguide during optical pulse propagation according to another embodiment of the present invention.

According to an embodiment of the present invention, the sensor nodes 100 include transducers 208 (e.g., acoustic or vibration sensors), and the electric output signal from the transducer 208 applied to an optical modulator that modulates light passing through the modulator (e.g., optical pulse) based on the signal detected by the transducer 208. FIG. 5 shows a diagram of the acoustic detecting light-modulating sensor 100 according to an embodiment of the present invention. The optical modulator 200 is arranged such that when a portion of the optical pulse 110 is split by the beam splitter 108 and directed toward the sensor node 100, the split portion of the optical pulse propagates to the optical modulator 200. When a signal 210 is detected by the transducer 208, the transducer 208 causes the optical modulator 200 to optically modulate the received optical pulse 110 according to the detected signal. In some embodiments, the optical modulator 200 is in-line with optical path 210, similar to that shown in FIG. 3.

In some embodiments, a mirror 206 is arranged adjacent the optical modulator 200 to reflect the modulated optical pulse back toward the beam splitter 108, and the beam splitter 108 returns (or directs) the modulated optical pulse back to the interrogator 104. According to an embodiment, the mirror 206 is positioned close to the optical modulator 200 such that the optical modulator 200 does not significantly change state before the reflected optical pulses passes through the optical modulator 200.

The optical pulse propagates from the first beam splitter 108 along an optical path 210 to the sensor node 100, and within the sensor node 100, the split portion of the optical pulse propagates through the optical modulator 200 to a mirror 206. The split portion of the optical pulse reflects off of the mirror 206 and passes back through the optical modulator 200, and propagates along the optical path 210 of the sensor node 100, back toward the beam splitter 108. The beam splitter 108 directs this optical pulse back to the interrogator 104 in a direction opposite to the original pulse. According to an embodiment of the present invention, the optical pulse is modulated when it passes through the in-line optical modulator 200 when the transducer 208 detects a signal. In some embodiments, the sensor node 100 can be configured such that the optical pulse 110 passes through the optical modulator 200 only one time. For example, the optical pulse 110 may pass through the optical modulator 200, reflect off of the mirror and return along the optical path 210 without passing through the optical modulator 200 a second time. Yet according to another embodiment, the optical pulse 110 may first reflect off of the mirror 206 and then pass through the optical modulator 200 after being reflected off of the mirror 206, and return along the optical path 210, and toward the optical interrogator 104.

In some embodiments, a second beam splitter 202 is positioned along the optical path 210 between the first beam splitter 108 and the optical modulator 200 to provide an unmodulated reference return signal to the interrogator 104. That is, the optical pulse that is split by the first beam splitter 108 (i.e., a first portion) is further split by the second beam splitter 202 (i.e., a portion of the first portion) and reflected to a reference mirror 204. The reference mirror 204 reflects the optical pulse back to the second beam splitter 202 and the first beam splitter 108, and back to the interrogator 104 as the unmodulated reference return signal. The second beam splitter 202 transmits a remaining portion of the optical pulse through the second beam splitter 202 to the optical modulator 200 and the mirror 206 as previously described.

Figure 6:
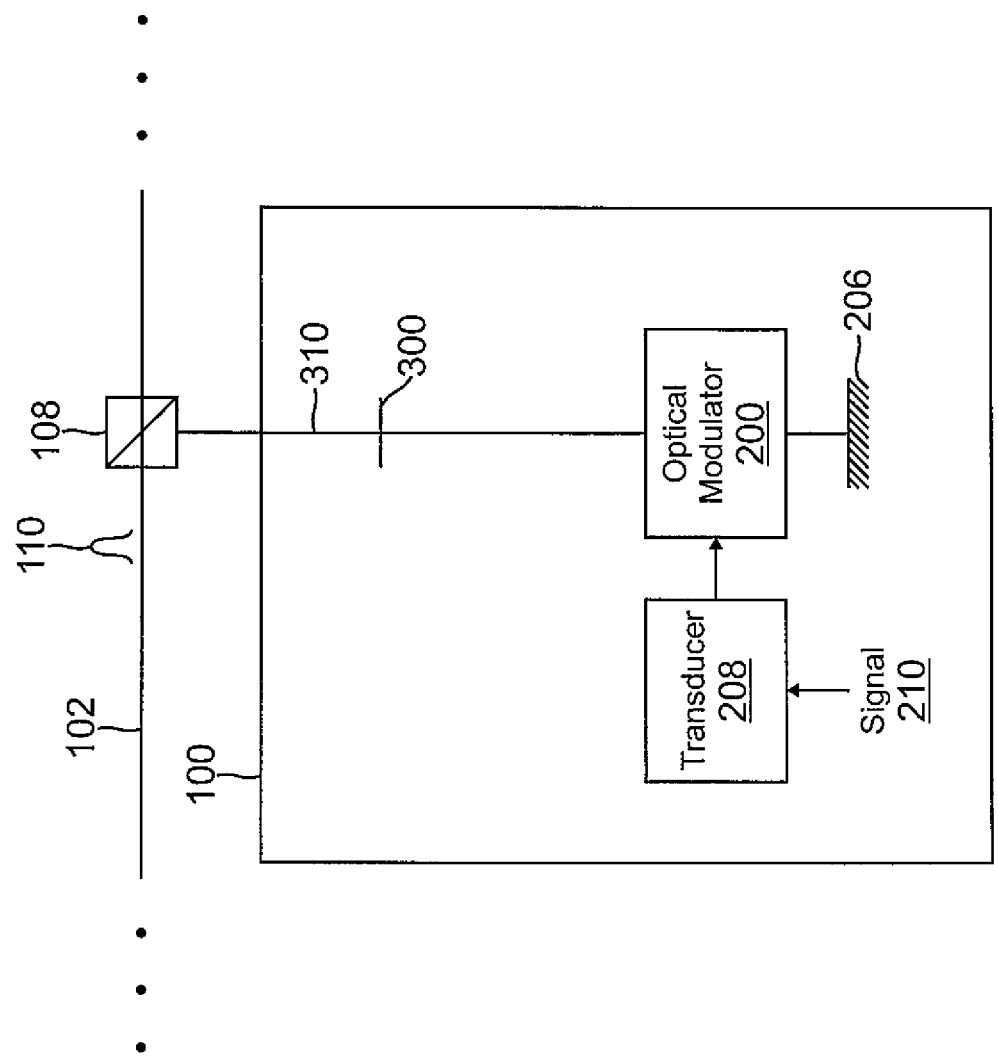
FIG. 6 shows a block diagram of a sensor node coupled to the optical waveguide and another method to compensate for distortions caused by the optical waveguide during optical pulse propagation according to another embodiment of the present invention.

In some embodiments, the unmodulated reference return signal is utilized by the receiver to remove any distortions so that the receiver can distinguish the modulated signal from the distorted signal by way of differential readout. For example, the distortions to the optical signal 110 caused by the optical waveguide 102 for both the modulated pulse and the unmodulated between the interrogator 104 and the sensor node 100 are identical. Thus, subtracting the unmodulated pulse from the modulated pulse will cancel the distortions, and the remaining signal is the modulated signal without the distortions FIG. 6 shows the sensor node 100 according to another embodiment of the present invention. Similar to the embodiment of FIG. 5, the optical modulator 200 and the mirror 206 are arranged within the sensor 100 to receive the optical pulse from the first beam splitter 108. However, differently from the embodiment of FIG. 5, in FIG. 6 a semi-transparent mirror 300 is positioned along the optical path 310 between the first beam splitter 108 and the optical modulator 200. The plane of the semi-transparent mirror 300 is normal with respect to the optical path 310 such that a portion of the optical pulse 110 from the first beam splitter 108 reflects off of the semi-transparent mirror 300, and returns back to the interrogator 104 as the unmodulated reference signal. The remaining portion of the optical pulse passes through the semi-transparent mirror 300 to the optical modulator 200, and the mirror 206. When a signal is present, the transducer 208 causes the optical modulator 200 to modulate the optical pulse, and the modulated optical pulse returns to the interrogator 104 where it is compared with the unmodulated reference return signal for a differential readout. In some embodiments, the optical modulator 200 is an in-line optical modulator.

Figure 7:
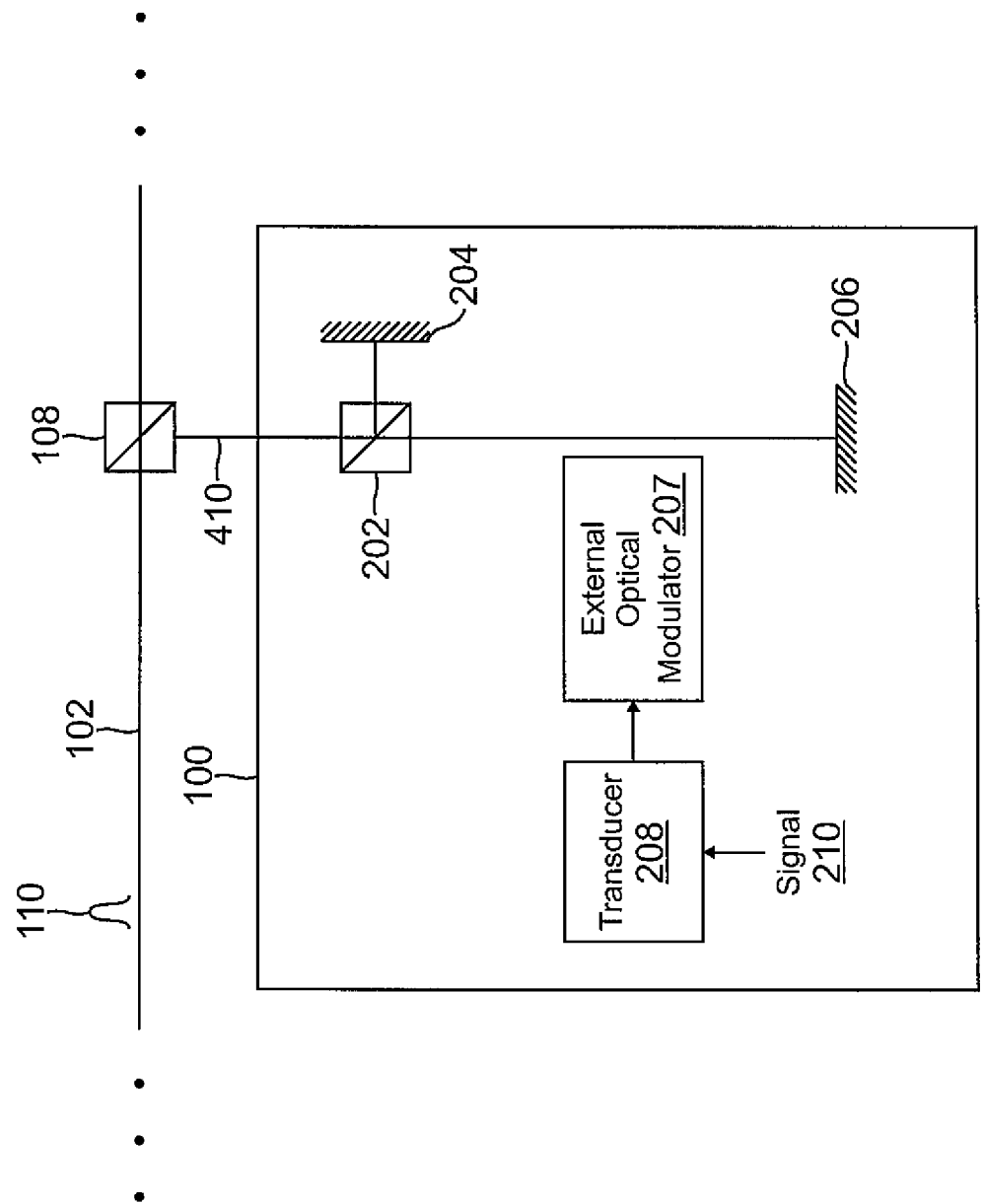
FIG. 7 shows a block diagram of a sensor node coupled externally with an optical waveguide according to another embodiment of the present invention.

FIG. 7 shows a sensor node 100 according to another embodiment that is similar to FIG. 5 for compensating for distortions by the optical waveguide. A first beam splitter 108 is disposed along the optical waveguide 102 where each of the sensor nodes 100 is connected to the optical waveguide 102. However, differently from the embodiment shown in FIG. 5, FIG. 7 includes an external optical modulator 207 that is coupled to the optical path 410 (e.g., between the first beam splitter 108 and sensor 100). According to the embodiment, instead of splicing a modulator into the optical waveguide 102, the optical modulator 207 externally changes the waveguide properties, for example, by applying a mechanical or physical force to the waveguide 102, or locally changing the temperature of the waveguide, or by applying an electric or a magnetic field (e.g., via electro-optical or magneto-optical effects).

Figure 8:
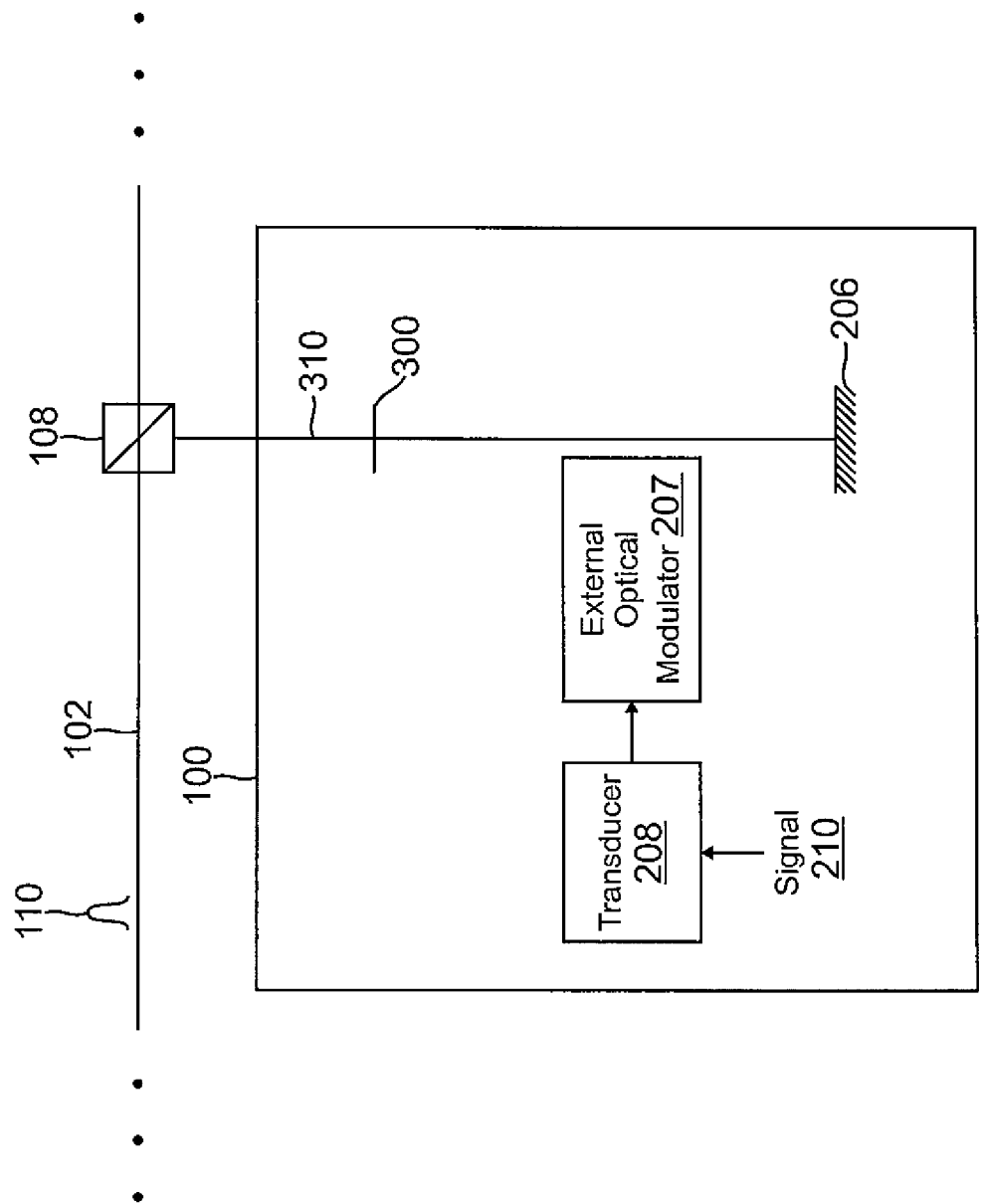
FIG. 8 shows a block diagram of a sensor node coupled externally with an optical waveguide according to another embodiment of the present invention.

FIG. 8 shows a sensor node 100 according to another embodiment that is similar to FIG. 6 for compensating for distortions by the optical waveguide. A first beam splitter 108 is disposed along the optical waveguide 102 where each of the sensor nodes 100 is connected to the optical waveguide 102. However, differently from the embodiment shown in FIG. 6, FIG. 8 includes an external optical modulator 207 that is coupled to the optical path 310. Also, differently from the embodiment shown in FIG. 7, a semi-transparent mirror 300 is provided in-line and normal with respect to the optical path 310. According to the embodiment, instead of splicing a modulator into the optical waveguide 102, the modulator 207 externally modulates the waveguide properties, for example, by applying a mechanical or physical force to the waveguide 102, or locally changing the temperature of the waveguide, or by applying an electric or a magnetic field (e.g., via electro-optical or magneto-optical effects).

According to the embodiments shown in FIGS. 7 and 8, the modulator 207 is configured to mechanically modulate the optical pulse from the exterior of the waveguide by, for example, vibrating or squeezing the optical path 410 from the exterior of the optical path 410, thus affecting the optical pulse. The vibrating or squeezing of the optical path can be performed by an actuator such as, for example, a piezoelectric actuator, thermal actuator, electromagnetic actuator, or other actuation mechanisms. In some embodiments, a signal is received by the sensor, and the sensor output (which may be amplified as suitable) is applied to the actuator (e.g., piezoelectric actuator). Accordingly, the mechanical excitation of the optical pulse caused by the mechanical modulator propagates back to the interrogator 104, where it is demodulated to determine which sensor 100 has detected the acoustics or vibrations. In some embodiments, the unmodulated reference can be used to cancel distortions caused by propagation in the cable (as described with reference to FIGS. 5-6, where the second ("reference") beam splitter or partially reflective normal mirror is utilized.

According to the various embodiments described in herein, the sensor system has an optical waveguide 102 that extends from an optical interrogator 104 at a proximal end to a distal end of the optical waveguide 102, which can have an optional end mirror 106 at the distal end. However, the end mirror 106 is not necessary for operation of this system.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims and their equivalents.

The invention claimed is:

1. A system for optically sensing signals, comprising:
an optical waveguide having a length extending from an optical interrogator at a first end wherein the optical waveguide is configured to propagate optical pulses from the optical interrogator; and
a plurality of light-modulating sensor nodes coupled to the optical waveguide at predetermined locations along the length of the optical waveguide, each of the plurality of sensor nodes comprising an optical modulator configured to modulate an optical pulse of the optical pulses when an input signal is received, and
wherein, when the input signal is received, a particular sensor node of the plurality of sensor nodes that comprises the optical modulator that modulated the optical pulse based on the input signal is configured to return the modulated optical pulse to the optical interrogator in an opposite direction along the same optical waveguide path such that a location of the input signal is determined based on the distance of the particular sensor node from the optical interrogator along the length of the optical waveguide.

2. The system of claim 1, wherein the optical modulator is externally coupled to the optical waveguide.

3. The system of claim 1, wherein the optical modulator comprises an actuator configured to optically modulate the optical pulse by changing physical properties of the optical waveguide from an exterior of the optical waveguide.

4. The system of claim 3, wherein the actuator is a piezoelectric actuator configured to vibrate or squeeze the optical waveguide.

5. The system of claim 3, wherein the actuator is a thermal actuator configured to change a local temperature of the optical waveguide.

6. The system of claim 3, wherein the actuator is an electromagnetic actuator configured to change optical properties of the optical waveguide.

7. The system of claim 1, wherein the optical interrogator comprises an optical pulse generator configured to generate the optical pulses.

8. The system of claim 7, wherein each of the plurality of sensor nodes further comprises a transducer, the transducer being configured to detect the input signal, wherein the input signal comprises a type of signal selected from the group consisting of: acoustic, vibration, magnetic, and chemical.

9. The system of claim 8, wherein the optical modulator is configured to modulate the optical pulse in response to the input signal detected by the transducer.

10. The system of claim 8, further comprising an amplifier configured to amplify an output signal from the transducer.

11. The system of claim 1, wherein the optical interrogator further comprises an optical receiver configured to receive the modulated optical pulse from the particular sensor node when the input signal is received.

12. The system of claim 11, wherein each sensor node of the plurality of sensor nodes is configured to reflect the optical pulses back to the optical interrogator and the receiver is configured to identify each sensor node of the plurality of light-modulating sensor nodes from which the optical pulses are reflected.

13. The system of claim 1, wherein the optical waveguide is an optic fiber.

14. The system of claim 1, wherein the optical modulator is in-line with the optical waveguide.

15. The system of claim 14, wherein the optical modulator comprises a phase modulator configured to change a phase of the optical pulses in the optical waveguide.

16. The system of claim 14, wherein the optical modulator comprises an amplitude modulator configured to change an amplitude of the optical pulses in the optical waveguide.

17. The system of claim 14, wherein the optical modulator comprises a polarity controller configured to change a polarization of the optical pulses in the optical waveguide.

18. The system of claim 14, wherein each of the plurality of sensor nodes further comprises a transducer, the transducer being configured to detect the input signal, wherein the input signal comprises a type of signal selected from the group consisting of: acoustic, vibration, magnetic, and chemical.

19. The system of claim 18, wherein the optical modulator is configured to modulate the optical pulse in response to the transducer detecting the input signal.

20. The system of claim 18, further comprising an amplifier configured to amplify an output signal from the transducer.

* * * * *